United States Patent
Jourdaine et al.

[19]

[11] Patent Number: 5,979,932

[45] Date of Patent: Nov. 9, 1999

[54] PROTECTION FOR THE OCCUPANTS OF A VEHICLE IN THE EVENT OF A SIDE IMPACT

[75] Inventors: Loic Jourdaine, Hemevillers, France; Franz Kraemling, Aachen; Stefan Immershitt, Herzogenrath, both of Germany

[73] Assignee: Saint-Gobain Vitrage, Courbevoie, France

[21] Appl. No.: 08/910,404

[22] Filed: Aug. 13, 1997

[30] Foreign Application Priority Data

Aug. 13, 1996 [DE] Germany ............................ 196 32 616

[51] Int. Cl.$^6$ .................................................... B60R 21/22
[52] U.S. Cl. .................................. 280/730.2; 296/146.16; 428/412
[58] Field of Search ............................ 280/730.2, 730.1, 280/728.1; 296/146.2, 146.16, 146.3; 428/524, 412, 423.1

[56] References Cited

U.S. PATENT DOCUMENTS

| | | | |
|---|---|---|---|
| 3,388,034 | 6/1968 | McCombie | 428/412 |
| 5,318,145 | 6/1994 | Vollmer | 280/730.2 |
| 5,346,767 | 9/1994 | Tilley et al. | 428/524 |
| 5,564,734 | 10/1996 | Stuckle | 280/730.2 |

FOREIGN PATENT DOCUMENTS 3-284443  12/1991  Japan ................................. 280/730.2

*Primary Examiner*—Eric Culbreth
*Attorney, Agent, or Firm*—Oblon, Spivak, McClelland, Maier & Neustadt, P.C.

[57] ABSTRACT

A device for protection of the occupants of a vehicle in the event of a side impact includes an inflatable bag (airbag (9)) placed in the side wall beneath a window in such a way that, in the activated state, it deploys in the direction extending between the occupant's head and the surface of the window. The window pane (15) is a compound glass pane which includes at least one glass sheet (16,17) and at least one intermediate layer (18) and which has an increased flexural strength because of the fact that: a) the layer (18) consists of a laminate composed of a core layer of an impact-resistant polymer, and of two thermoplastic adhesive layers, of polyvinyl butyral or of polyurethane, which are placed on both sides of the PET layer, or b) the layer (18) is made of a plastic having a Young's modulus at least equal to 20 MPa.

11 Claims, 1 Drawing Sheet

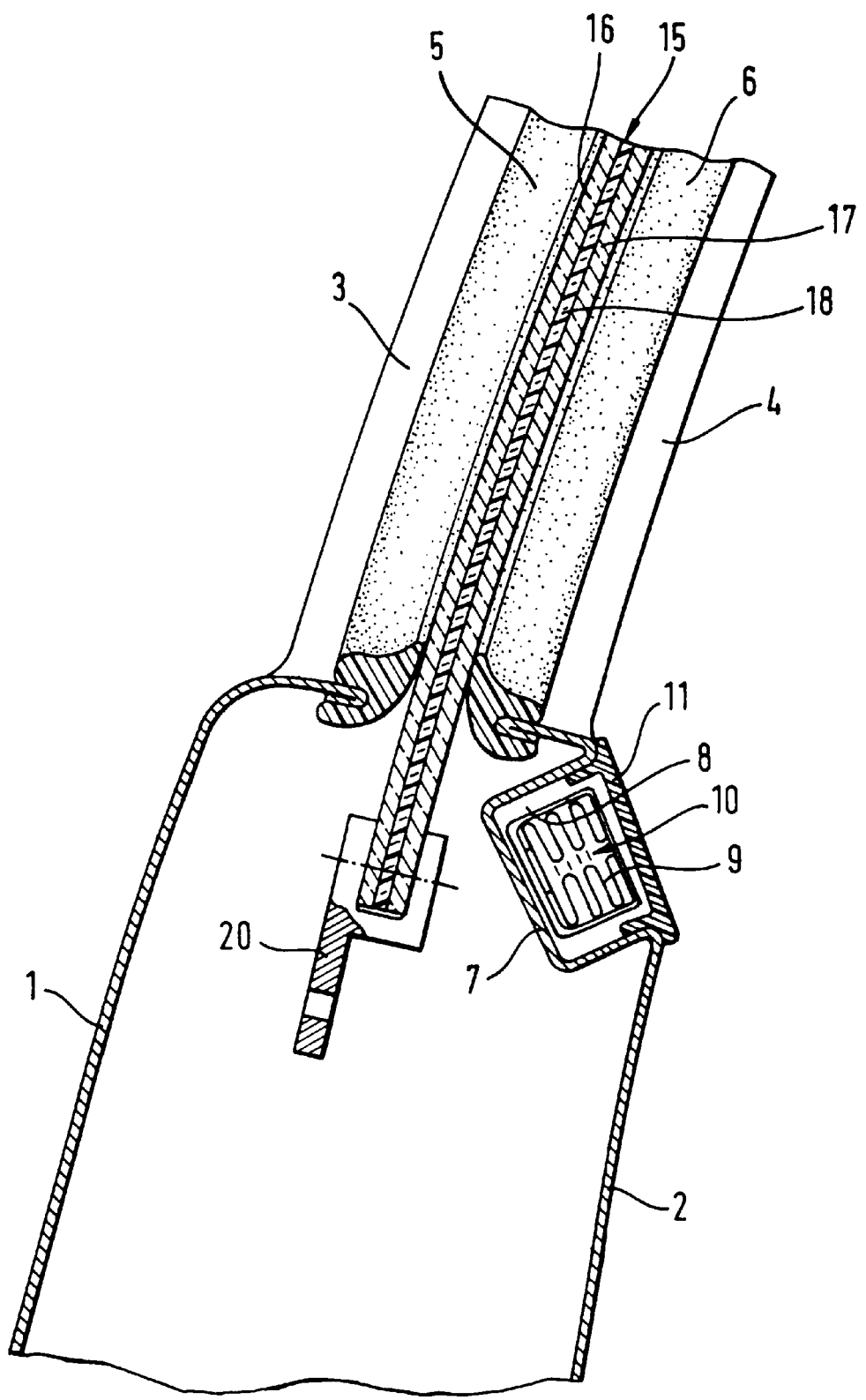

PROTECTION FOR THE OCCUPANTS OF A VEHICLE IN THE EVENT OF A SIDE IMPACT

BACKGROUND OF THE INVENTION

1. Field of the Invention

The present invention relates to a device for protection of the occupants of a vehicle in the event of a side impact, which includes an inflatable bag called an airbag placed in the side wall of the vehicle.

2. Discussion of the Background

In the case of the known protection devices of the side wall type, the airbag is always placed in such a way that, in the activated state, it presses against one element of the bodywork, so that it can fulfil its protection function. Arrangements in which the airbag presses against a side window pane are, as a general rule, avoided. The basis for this is the fact that, in general, when the vehicle is in a collision the side window panes break and thereby expose the entire window opening, since they are normally made of safety glass consisting of a single sheet, which fragments into small pieces should it break. In the case of the known protection devices, these provide insufficient protection in the event of a side impact. A need, therefore, continues to exist for an improved device for protection of occupants of a vehicle in the event of a side wall impact.

SUMMARY OF THE INVENTION

Accordingly, one object of the present invention is to design a device for protection in the event of a side impact which includes an airbag, in such a way that sufficient protection is also provided in the region of the surface of the window.

Briefly, this object and other objects of the present invention as hereinafter will become more readily apparent can be attained by a configuration in which an airbag is placed alongside a window in such a way that, in the activated state, it deploys in the direction of the window surface, the pane of which is a compound glass pane which comprises at least one glass sheet and at least one intermediate layer, wherein:

a) the intermediate layer consists of a laminate composed of a core layer of an impact-resistant polymer and of two thermoplastic adhesive layers, of polyvinyl butyral or of polyurethane, which are placed on both sides of the impact resistant polymer layer, or b) the intermediate layer is made of a plastic having a Young's modulus at least equal to 20 Mpa, said glass pane having increased flexural strength.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein:

FIG. 1 shows, in vertical cross-section, the central region of a vehicle door having a door pane which can be lowered.

DETAILED DESCRIPTION OF THE PREFERRED EMBODIMENTS

The arrangement of the invention relies on the fact that compound glass panes, having an increased flexural strength, are more robust and also, in the case of a side impact, withstand higher stresses. Even if they break, they do not fragment into small pieces, like the usual safety glass panes containing a single sheet, but break into large fragments which are held together by the intermediate film so that the risk of the airbag being destroyed by the sharp edges of the fragments is non-existent. Consequently, they represent a sufficient bearing surface for the airbag not only when they are intact but also after the compound glass pane has broken, so that the airbag can fulfil its protection function completely.

If the intermediate layer 18 is a laminate, the partially toughened glass sheet or sheets 16, 17 each have, preferably, a thickness of from 1.5–2.5 mm and compressive prestresses in the surface layers of from 25–100 MN/m$^2$.

According to a preferred embodiment of the invention, when the intermediate layer 18 is made of a plastic having a Young's modulus at least equal to 20 Mpa, the glass pane 15 has a total thickness of less than 15 mm, a ratio of the thickness of the layer 18 to the thickness of each glass sheet 16, 17 is between 1 and 10, and a Young's modulus of the glass pane is greater than 30 GPa for a total glazing thickness of 3 mm.

The plastic of layer 18 comprises, as a major portion, at least one polymer material selected from the group consisting of an ionomer resin such as a copolymer of ethylene and of (meth)acrylic acid neutralized by a polyamine, a non-thermoplastic polyurethane, a thermoplastic polyurethane, a poly(ethylene terephthalate), a polyester or an acrylic resin, optionally modified.

The adhesion between glass and plastic is such that the tear strength is at least 20 N/cm for a strip 1 cm in width. If necessary, an adhesion promoter is deposited on the glass or introduced into the plastic in order to achieve the desired value. Each glass sheet 16, 17 has a thickness of between 0.5 and 1.5 mm and the layer 18 has a thickness of between 2 and 10 mm.

The door construction comprises the outer wall 1 and the inner wall 2, which form the door well, as well as the window frame 3, 4 inside which the pane 15, which can be lowered, is mounted so as to slide between profiled sealing strips 5, 6.

In the upper part of the inner wall 2, just below the window opening, the inner wall has a cavity 7. This cavity 7 forms a chamber 8 in which a cassette 10 containing an airbag 9 is placed. The cassette 10 also contains the devices necessary for suddenly inflating the airbag when it is activated by the collision detectors provided in the vehicle. The chamber 8 is closed off from the passenger compartment by a cover 11 which, upon activation of the airbag, becomes detached from its anchoring point. Upon activation of the airbag, the latter deploys obliquely upwards in the direction of the head and shoulder of the driver or of the passenger and, in this case, presses against the pane 15.

The pane 15 is a laminated glass pane and consists of two glass sheets 16 and 17, which are joined together via a thermoplastic interlayer 18. The thermoplastic interlayer 18 may be a homogeneous layer and consist, for example, of polyvinyl butyral or of polyurethane, as is usually the case for compound safety glass panes for motor vehicles.

A compound glass pane, in which the interlayer 18 consists of a laminate composed of two thermoplastic adhesive films, in particular made of polyvinyl butyral or of polyurethane, and of a film of an impact-resistant polymer, for example polyethylene terephthalate (PET), placed between these two adhesive films, is particularly robust even in the broken state. For its part, the PET film may be provided with an infrared-reflective transparent coating.

The two glass sheets 16 and 17 have, compared to normally cooled float glass, an increased flexural strength which is achieved by the fact that these glass sheets are partially toughened, by sudden cooling, after bending. Sufficient flexural strength of the compound glass pane is achieved when each of the two glass sheets 16, 17 has a thickness of from 1.5–2.5 mm and each is cooled at a cooling rate such that the compressive prestress in the surface layers of the glass sheets is from 25–100 MN/M$^2$.

A fixing and force-transferring element 20 is suitably fixed, as usual, to the lower edge of the compound glass pane 15, which element is actuated by devices, not shown in this case, by means of which the pane 15 is moved upwards and downwards.

The disclosure of German Application No. 196 32 616.8 filed Aug. 8, 1996 is hereby incorporated by reference into the application.

obviously, numerous modifications and variations of the present invention are possible in light of the above teachings. It is, therefore, to be understood that within the scope of the appended claims, the invention may be practiced otherwise than as specifically described herein.

What is claimed as new and desired to be secured by Letters Patent of the United States is:

1. A device for protection of an occupant of a vehicle in the event of a side impact, which comprises:

an airbag placed in a side wall of the vehicle, alongside a side window of the vehicle in such a way that, in an activated state, it deploys in a direction extending between the occupant's head and the surface of the side window, the window comprising a compound glass pane which includes two glass sheets and at least one intermediate layer, wherein the intermediate layer comprises a laminate composed of a core layer of an impact-resistant polymer, and of two thermoplastic adhesive layers which are placed on both sides of the impact resistant polymer layer.

2. The device according to claim 1, wherein the glass sheets each has a thickness of from 1.5–2.5 mm and compressive prestresses in the surface layers of from 25–100 MN/m$^2$.

3. The device according to claim 1, wherein said impact resistant polymer is polyethylene terephthalate.

4. The device according to claim 1, wherein the two thermoplastic adhesive layers are formed of polyvinyl butyral or of polyurethane.

5. A device for protection of an occupant of a vehicle in the event of a side impact, which comprises:

an airbag placed in a side wall of the vehicle, alongside a side window of the vehicle in such a way that, in an activated state, it deploys in a direction extending between the occupant's head and the surface of the side window, the window comprising a compound glass pane which includes two glass sheets and at least one intermediate layer, wherein the intermediate layer is made of a plastic having a Young's modulus at least equal to 20 Mpa.

6. The device according to claim 5, wherein the glass pane has a total thickness of less than 15 mm, a ratio of the thickness of the intermediate layer to the thickness of each glass sheet is between 1 and 10, and a Young's modulus of the glass pane is greater than 30 GPa.

7. The device according to claim 6, wherein the plastic of the intermediate layer comprises at least one of the constituents selected from the group consisting of an ionomer resin, a non-thermoplastic polyurethane, a thermoplastic polyurethane, a poly(ethylene terephthalate), a polyester and an acrylic resin.

8. The device according to claim 7, wherein said ionomer resin is a copolymer of ethylene and acrylic acid neutralized by a polyamine.

9. The device according to claim 6, wherein an adhesion between glass and plastic is such that the tear strength is at least 20 N/cm for a strip 1 cm in width.

10. The device according to claim 9, wherein an adhesion promoter is deposited on the glass or introduced into the plastic in order to achieve said adhesive strength.

11. The device according to claim 5, wherein each glass sheet has a thickness of 0.5–1.5 mm and the intermediate layer has a thickness of 2–10 mm.

* * * * *